Nov. 23, 1937.   R. PERRIN   2,100,264
TREATMENT OF METALS AND SLAGS
Filed May 23, 1934
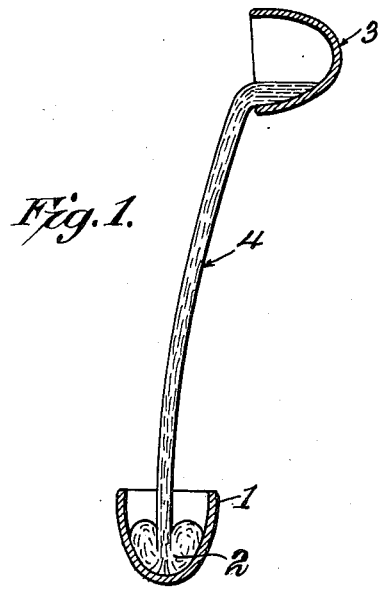
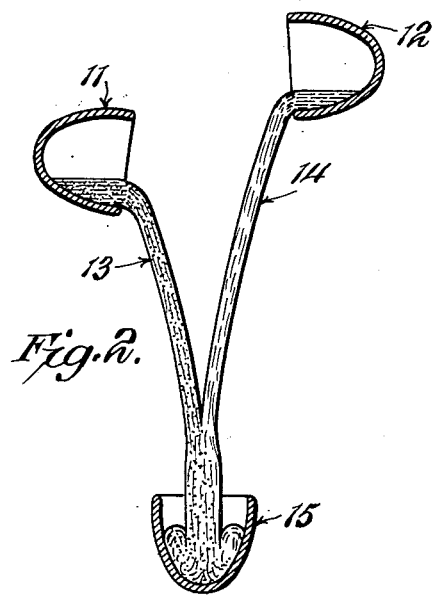
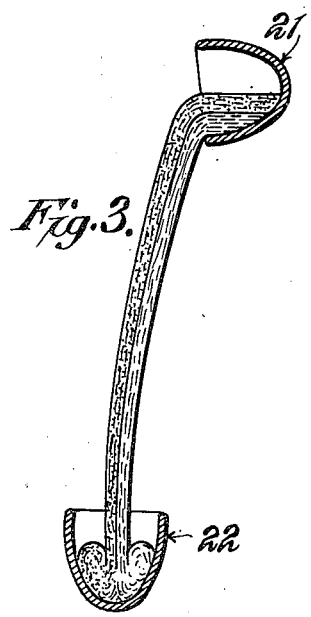
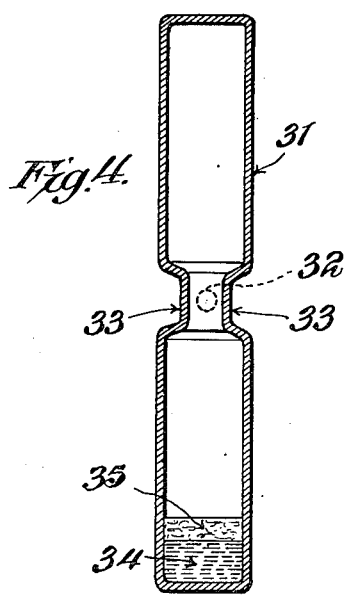
Inventor,
René Perrin,
By Mauro & Lewis
Attorneys Patented Nov. 23, 1937

2,100,264

UNITED STATES PATENT OFFICE 2,100,264

TREATMENT OF METALS AND SLAGS

René Perrin, Paris, France, assignor to Société d'Electrochimie, d'Electrometallurgie et des Aciéries Electriques d'Ugine, Paris, France, a corporation of France Application May 23, 1934, Serial No. 727,177
In Italy July 11, 1932

27 Claims. (Cl. 75—24)

The present invention relates to the treatment of metals and slags of any kind, and more especially to treatments whereby metals and slags are deoxidized. In my Patent No. 2,015,691, October 1, 1935, a process has been described, in which the deoxidation of the metal is brought about by causing a violent and intimate dispersion of one into the other, whereby the oxides are washed from the metal and taken up in the slag. Similarly, slags may be deoxidized, particularly for the purpose of regenerating them for re-use, by causing a violent and intimate intermixing of molten slag with a reducing agent, or with a metal containing a deoxidizing agent.

After deoxidizing operations, the slag may, in the case of the treatment of steel, contain oxides of iron and manganese in such amount as to unfit the slag for deoxidation of further quantities of steel. Such exhausted slag may be discarded and a new slag provided. However, such procedure is wasteful not only of slag-making materials, but also of heat, and I therefore prefer to regenerate the exhausted slag. By regeneration I mean reducing the iron and manganese oxide contents of the slag so as to fit it for deoxidizing further amounts of steel.

Such regeneration may be carried out by treating the slag in a furnace with reducing agents to effect such reduction. However, such operations are relatively long, require the continued application of heat, and withhold the slags being treated for further use until after such lengthy furnace regenerating process is completed. I therefore prefer to regenerate the slag by the quick regenerating process hereinafter described which conserves both heat and time. Such regenerating process, generally speaking, consists in bringing about a quick regeneration of the slag, by violently and thoroughly intermixing with the slag a reducing agent, so that said reducing agent may act quickly throughout the whole body of the slag to reduce the oxides contained therein, namely, the iron and manganese oxides in the case of slag that has been used for the deoxidization of steel, and thus regenerate the slag to a condition for further use.

For this purpose the intermixing between the oxidized fluid molten slag and the reducing agent is effected with such violence as to bring about as great an amount of subdivision as possible of the slag and to turbulently emulsify the reducing agent into the slag, thus bringing practically every particle thereof into contact with the reducing agent. In order to obtain effective reduction in a short time the reducing agent is caused to act in a state of subdivision, preferably in powder, or in a molten state, so as to become dispersed throughout the slag.

The reducing agents used for regenerating the slag may be of very varied kinds, for example carbon, calcium-carbide, aluminium, silicon, manganese, ferro-titanium, calcium, etc. or any combination or mixture of these different reducing agents. The important point is that the intermixing and turbulence between the slag and deoxidizer or deoxidizers used shall be of such a violence as to produce very intimate contact between the slag and the deoxidizer. Under these conditions an extremely rapid deoxidation—i. e. the regeneration—of the slag is obtained, which in particular does not necessitate the supply of external heat.

My regenerating process may be employed not only for restoring oxidized slags used in my steel deoxidizing process, but also for reducing oxides contained in oxidized slags of any kind.

By way of example, the slag regeneration will be described hereinafter in connection with deoxidizing slags employed according to the process described in my Patent No. 2,015,691 above mentioned in which the deoxidation of the steel is effected as follows: The molten steel and a molten fluid slag capable of extracting iron and manganese oxides from the steel are violently intermixed together in such a way that the slag is finely divided and spread out in the steel under the form of a kind of emulsion and the mass of steel and divided slag is subjected to a violent turbulence. This may be accomplished, for example, by a violent impact of the molten steel upon the slag, whereby not only is the slag broken up into small particles and dispersed into the steel, but the mass of steel and dispersed slag is given a violent churning or turbulence, insuring the rapid and thorough distribution of the finely dispersed slag throughout the mass of metal. This may be accomplished by causing a rapidly moving stream or body of molten steel to violently impinge against and into a body of very fluid slag. The intermixing of the slag and steel should be violent and rapid enough to bring about quickly an intimate contact of very large surface area, because of the breaking up of the slag into fine particles, between the slag and metal, resulting in allowing the concentration of the manganese and iron oxides in the metal and in the slag rapidly to approach a state of equilibrium, thus causing a quick transfer of the iron and manganese oxides from the metal into the slag.

For this purpose, the slag employed for deoxidizing the steel must be such that there is a state of disequilibrium between the oxides dissolved in the metal and in the slag.

As described in my Patent No. 2,015,691 the slag employed is an acid slag poor in iron oxide, having a high power of extracting the iron and manganese oxides which are in solution in the steel and containing for this purpose a relatively large amount of acidic substance, such as $SiO_2$ or $TiO_2$ which will combine with FeO and MnO. On account of cheapness it is preferred to render the slag acid with a relatively large amount of silica. However, a slag containing a very high proportion of silica is a viscous slag. It is therefore necessary to combine with the silica, agents which will render the silicious slag fluid at the temperature of the molten steel, without impairing its acidity or raising its iron oxide content.

I have found that the use of alumina, or alumina together with magnesia or lime, in a slag poor in FeO, will give the necessary fluidity without undesirably impairing the acidity of the slag. Synthetic slag suitable for the process may be made by combining 45 to 65% silica, 4 to 25% alumina, 4 to 25% magnesium oxide, and 4 to 25% calcium oxide. Magnesia may be used as the fluidification agent alone or in combination with alumina or an alkali oxide or an alkaline earth oxide. From 3 to 25% of soda, in the form of soda or its salts, or of kryolith, as well as potash, magnesia and baryta, or its salts, with or without alumina additions, may be used to increase the fluidity of the slag. Boric acid in the form of boric acid or its salts increases the fluidity of the slag while maintaining its acidity.

Titania ($TiO_2$) is particularly effective in imparting great fluidity to the slag without decreasing its acidity. $TiO_2$ acts as an acid in combining with FeO and MnO. The titania may therefore be substituted for a considerable portion of the silica, if desired, particularly if it is desired not to have silicon introduced into the metal from the slag. The titania may be used in varying amounts from 5 to 80% of the slag.

Zirconia may also be employed for the purpose of increasing the fluidity of the slag.

As aforesaid the slag should be relatively poor in FeO. For a slag containing silica below 60% and not containing $TiO_2$, the FeO content should preferably be below 4%, but I usually have less than 2%. The permissible amount of FeO is dependent upon a number of factors, such as the composition of the slag, the degree to which it is desired to deoxidize the steel, the carbon content of the steel, the amount of slag, etc., so that no absolute percentage limit can be very well fixed for the FeO. In general, the more acid the slag, the more FeO can be tolerated. Also, the addition of $TiO_2$ will allow a larger amount of FeO in the slag. The slag must, however, be always relatively poor in iron oxide, and by this I mean that the iron oxide in the slag must be sufficiently low so that the slag has the capacity to extract iron oxide from the steel to be deoxidized.

Manganese oxide combines with silica by giving compounds of much greater stability (because of the less disassociation of MnO) than does FeO. Therefore, the MnO content of the slag may be considerably higher than its FeO content, even up to 30% MnO in some slags containing little or no FeO or other bases. The MnO should, however, be low enough so that the slag has the ability to extract MnO from the steel to be deoxidized.

As typical slag compositions, which are described in my Patent No. 2,015,691, the following are given by way of example only:

|     |            | Percent |
|-----|------------|---------|
| (1) | $SiO_2$    | 58.20   |
|     | $Al_2O_3$  | 15.80   |
|     | MgO        | 18.08   |
|     | CaO        | 2.80    |
|     | MnO        | 4.30    |
|     | FeO        | 0.40    |
| (2) | $SiO_2$    | 68.50   |
|     | $Al_2O_3$  | 11.95   |
|     | CaO        | 8.10    |
|     | MnO        | 4.20    |
|     | $Na_2O$    | 7.00    |
|     | FeO        | 0.25    |
| (3) | $SiO_2$    | 70      |
|     | $Na_2O$    | 25      |
|     | CaO        | 5       |
| (4) | $SiO_2$    | 52      |
|     | $TiO_2$    | 19      |
|     | $Al_2O_3$  | 12      |
|     | MnO        | 9       |
|     | CaO        | 5       |
|     | FeO        | 3       |

Also, as described in Patent No. 2,015,691, I have found that the deoxidation process may be improved by the addition to the steel before the slag deoxidizing treatment, of a metal, such as manganese or chromium, which is capable of being oxidized at the expense of the oxide of iron in the steel, and the oxide of which is soluble in the steel in such a manner as not to cause inclusions, even if the steel to be deoxidized contains some manganese or chromium.

I prefer to use manganese as such addition and in general, I prefer to add about 0.5 to 0.8% manganese above that which it is desired to have remain in the steel. Before the addition of the manganese, the oxygen contained in the steel is in the form of oxides of iron and manganese dissolved in the steel. After the addition of the manganese, a portion of the oxygen, which was in the form of iron oxide, passes into the form of manganese oxide. The quantity of FeO dissolved in the oxidized steel is thus diminished and there is formed, instead, manganese oxide. Iron appears to have a higher capacity for dissolved iron oxide than for manganese or chromium oxides. Therefore, when the oxidized steel to which manganese is added is treated with the slag, the slag will thus carry away a greater total quantity of oxygen, and on account of the manganese addition there will be more complete deoxidation of the steel.

After the steel is deoxidized, the deoxidized steel may be tapped into ingot molds, as described in my Patent No. 2,015,691 or may be utilized in the regeneration of the slag, as hereinafter described.

The mechanical apparatus and procedure for producing the violent intermixing of molten oxidized slag and reducing agent are similar to that employed for deoxidizing an oxidized steel by violently intermixing the same with a deoxidizing slag.

The illustrative showings of the drawing apply to slag regenerating procedure according to the invention as well as to steel deoxidizing procedure.

In the drawing:

Figures 1, 2, 3, and 4 are diagrammatic views showing examples of procedures by which such violent intermixing may be accomplished, both for deoxidizing the metal and for also deoxidizing the slag.

I will first describe, by way of example, the procedure in deoxidizing the metal with particular reference to the drawing.

In Figure 1 of the drawing, reference numeral 1 indicates a container, illustrated as a ladle, in which is placed a molten fluid slag capable of extracting the soluble oxides from the steel and in which the violent and intimate mixing of the slag and steel occurs. This body of slag is indicated at 2.

As an illustrative example, 1750 kilograms of slag may be employed for about 15000 kilograms of steel. After the molten fluid slag is put into the ladle 1, a charge of molten steel is poured rapidly into the ladle 1 from a container holding the steel, illustrated as a ladle 3. The ladle 3 is positioned far enough above the ladle 1 so that the stream of steel 4 strikes against the slag 2 with considerable violence. As an illustrative example, a charge of 15000 kilograms of steel is poured from a height of about 10 feet in about 1 minute or less. This rate of pouring furnishes a fairly thick stream of steel which falls with considerable force against and into the slag in the lowermost ladle 1. The kinetic energy of the falling stream of steel causes a breaking up and intimate admixture of steel and slag as the steel impinges against the slag. As the stream of steel hits the slag, not only is there an intimate mixing, which is believed to be in the nature of an emulsification or fine dispersion of the slag into the steel, but there is a violent churning or turbulence of the contents of the ladle, resulting in an immediate intimate and thorough distribution of the dispersed slag in the mass of metal.

This turbulent condition rather quickly subsides due to the frictional dissipation within the mass of the energy of turbulence, whereupon there occurs a rapid and thorough gravity separation of the steel from the slag, resulting in a bath of metal in the bottom of the ladle which is freed from the slag. The very fluid condition of the slag not only permits the dispersion or emulsification thereof into the metal in separated finely divided particles, but also allows a thorough and rapid gravity separation of slag and metal.

Fig. 2 illustrates a procedure in which the violent intermixing of steel and slag is otherwise accomplished.

This figure shows two ladles 11 and 12 for holding slag and steel, respectively, and from which streams of slag and steel are poured simultaneously into a receiving and mixing ladle 15. The ladle containing the steel should, of course, be elevated sufficiently above the receiving ladle so that the stream of steel will strike into the receiving ladle with sufficient impact to cause the violent, quick and intimate intermixing of the steel and slag.

In Figure 3 there is illustrated another example in which a container, such as a ladle, 21, is initially charged with a bath of steel having a supernatant layer of molten fluid slag. The pouring ladle 21 is elevated above a receiving ladle 22 and the contents poured into the receiving ladle. The charge should be poured from a sufficient height so that there is a violent intermixing and dispersion of the slag and steel due to the arrested kinetic energy of the falling charge. If desired, an arrangement of two ladles, such as shown in Figure 3, may be employed for pouring the charge back and forth a number of times to secure repeated intermixing of the slag and steel. For example, ladles 21 and 22 may be mounted on suitable elevating mechanisms whereby one ladle may be elevated, say, a distance of 10 to 20 feet above the other ladle and the charge poured, and then the emptied pouring ladle is lowered and the full receiving ladle is raised and the charge repoured back into the first ladle.

In Figure 4 there is diagrammatically illustrated an arrangement of a single vessel by which a violent intermixing of slag and steel may be accomplished. As illustrated in Figure 4, a relatively long closed container 31, preferably having the general shape illustrated, is trunnioned to be turned about an axis 32. It will be understood, of course, that the drawing is diagrammatic and that the container will be provided with a suitable lining and preferably with heat insulation. The container 31 is preferably provided with restricting portions 33 which serve somewhat as dams to control the discharge of metal and slag from the top to the bottom of the container as the container is inverted. A charge of molten steel 34 and molten slag 35 is put into the container 31. The container is then quickly inverted and its movement quickly stopped in the vertical inverted position. As the container is being swung into its inverted position, the dam 33 tends to hold back the metal and tends to allow the slag to first fall into the then lower part of the container, to be followed by metal which plunges into the slag. Also, the inertia of the metal will tend to retain the metal in the then upper part of the inverted container from which it falls by gravity into the then bottom part of the container where there is a violent impact of steel with slag to cause a thorough intermixing of the two. As an illustrative example, the container 31 may be 10 to 20 feet in length and may be given several rapid inversions per minute.

As aforesaid, the mechanical apparatus illustrated in the drawing may be employed in a similar way for carrying out the procedures in regenerating the slag, when the regenerating operation is carried out by using the reducing agent with the slag, so as to produce a violent, quick and very intimate contact between the slag and deoxidizer. For such purpose the deoxidizer should be in a powdered or finely divided condition and be quickly and thoroughly dispersed throughout the entire body of the slag. Under such conditions a supply of external heat is not required. Such operation may be carried out, for exaample, in the form of apparatus shown in Figure 4, by charging the container with the slag to be regenerated, together with the deoxidizing agent, and then continuing the rapid inversion of the container until deoxidation of the slag is completed. Using the reducing agent, the reaction on the first inversion is only partial, since the small quantity of reducing agent is not brought into contact with all portions of the slag. Therefore, the violent intermixing operation should be continued until the reducing agent has an opportunity to act upon all of the slag.

Another very simple means of carrying out the process, consists in placing the reducing agent in a ladle, or any receptacle, such as the ladle 1, after placing at the bottom of this ladle, a small quantity of slag, so as to prevent the reducing agent or agents from sticking to the sides of the receptacle, and to then pour violently on to these reducing agents the slag to be deoxidized in such a way as to form a kind of emulsion with the said slag. The reducing agent may also be poured into any receptacle such as the ladle 1 and the slag violently poured in at the same time.

Whatever the process used for the regeneration of the slag by deoxidation, the slag becomes enriched by the oxide or oxides of the reducing agent or agents which have been employed, unless the oxidization of the reducing agent gives rise to gaseous products. It is therefore advisable to use as reducing agents bodies the oxides of which appear in the initial composition of the slag, so as to alter to the least possible extent the nature thereof.

As there are always unavoidable losses of slag in the different manipulations thereof, it will suffice in the majority of cases to add, in order to compensate for such losses, a certain quantity of the components of the slag other than the oxides of the reducing agents employed. By way of example, if a slag containing silica, alumina, magnesia and lime be employed, silico-aluminum and silico-calcium may with advantage be used as reducing agents so as to have to add to the slag, in order to compensate for the losses due to manipulation and other causes, only magnesia, while still retaining a practically constant composition of the slag.

In the same line the addition of fresh slag-making materials may be used as a means for lowering the content of the slag in oxides. Practically such a process should preferably not be used for lowering the content of the oxides the content of which should be low after the deoxidation operation, for instance FeO the content of which should be kept low for a further deoxidation operation. On the contrary, such a process is especially advisable for the lowering of the content of the oxides such as MnO, the content of which may be kept rather high. For instance if the content of MnO can be maintained for a further deoxidation operation at a ratio of 15% and if the content of MnO after the deoxidation process has reached 20% it will suffice, in order to bring down the content of MnO to 15%, to replace one quarter of the total quantity of the oxidized slag.

A very advantageous way of carrying out the regeneration consists in submitting the slag to a reducing operation in a furnace or in treating it by means of any of the above described processes, in order to lower the content in FeO, which is more easily reducible than MnO, and to lower the content in MnO by discarding a certain quantity of the slag and replacing it by fresh slag-making materials.

The reduction of FeO may take place before or after the replacement of a part of the slag.

In the operation of deoxidizing a steel according to my process, a certain quantity of lime is in many cases introduced into the slag, this lime originating from the basic slag which was in contact with the steel before the deoxidizing operation. The slag is therefore altered during the steel deoxidizing operation not only by the increase in iron and manganese oxides from the steel, but also by the addition of lime. Lime is not regenerable; that is to say, it cannot be reduced, and in order to decrease the proportion of lime in the slag it is in such cases necessary to discard a part of the slag and add new slag-making materials. Such addition of new slag-making materials, such as silica, alumina, titania, etc. may effect a sufficient reduction in the percentage of the manganese oxide, so that there only remains the necessity for lowering the iron oxide content at the desired point, which may be done by treating the slag with a reducing agent.

I have found that, in the case of slag that has been applied to the deoxidation of steel, it is not necessary to carry the regeneration of the slag to a point where all or practically all of the manganese oxide and iron oxide is reduced. In fact, it is advantageous, from an economical standpoint, that the reduction of the oxides of manganese and iron in the slag should not be carried out to completion, and particularly that the contents of FeO and MnO should not be lowered below about 1.5% and 3% respectively, in the case of slags of the acid type relatively poor in FeO, which are especially suitable for the application of my deoxidizing method owing to their high dissolving power for FeO and MnO.

It has, in fact, been found that such slags, even when containing considerably higher contents of FeO and MnO still exhibit the capacity, when thoroughly intermixed with an oxidized steel in accordance with my process, whether it does or does not contain added manganese, for dissolving considerable quantities of FeO and MnO, and consequently for suitably deoxidizing the steel. Thus, a slag of a content of about 1.6% of FeO, before being intermixed with the steel, yielded after intermixing 2.9% FeO. A slag containing, before intermixing with the steel, a content of MnO amounting to 6.96%, yielded, after intermixing with an oxidized steel laden with manganese, a content of 12.42% MnO. The steels resulting were of excellent quality. It is therefore possible to use in my deoxidation method employing an acid slag, slags with contents of MnO exceeding 3% and/or contents of FeO exceeding 1.5%. The regenerated slag will, however, always be relatively poor in iron oxide, and by this I mean that the iron oxide in the regenerated slag is sufficiently low so that the regenerated slag has the capacity to extract iron oxide from the steel to be deoxidized.

It has also been ascertained that the regeneration of slags by the reduction of the oxides is enormously facilitated and rendered much more economical, if no attempt is made to bring the content of MnO and FeO below the percentages above mentioned. It has, in fact, been found that with an acid slag, if an attempt is made to lower the contents below these limits, it is impossible to do so without at the same time reducing considerable quantities of the acid components, silica or titanic acid for example, of the slag, and the reduced proportion of these acid components is all the greater the more the contents of FeO and MnO are lowered. Moreover, the reduction of the silica, for instance, involves an additional expense in the reducing agents, a considerable consumption of energy, and an extension of the reducing operation, which considerably increases the cost price of the regeneration of the slag, and therefore the deoxidizing operation.

The percentages of FeO and MnO at which it is advisable to stop in the regeneration of the slag, are essentially a function of the other constituents of the slag. If such slag, for instance is not very rich in silica, it is possible by an economic procedure to reduce the contents concerned below those mentioned. In the case of a very silicious slag, on the contrary, it will be advisable in practice, so as to remain within economical conditions, to seek, when manganese is added to the steel before deoxidizing, a content of MnO, after regeneration, which is not much less than 10%.

The following is an example in support of the foregoing which will at the same time show the advantage of this feature of the process and its economy:

An acid slag before intermixing with an oxidized steel in which manganese was present, contained 0.88% FeO and 0.39% MnO. After intermixing with the oxidized steel, the composition was as follows: 1.51% FeO, 5.06% MnO and 52.3% SiO₂.

An attempt was then made to regenerate this slag by aluminum. The following content was obtained: 46.7% SiO₂ and 1.01% FeO, the manganese oxide remaining unchanged. It was therefore found that, without having yet obtained a practical result in the regeneration since as the only beneficial result obtained was a fall of 0.5% in FeO, 4.6% of silica was quite uselessly reduced. This shows that if it had been desired to revert to contents of FeO and MnO, corresponding approximately to those of the original slag, a considerable expense in reducing agents would have been necessary, which would have rendered the cost of the operation very high, and then only a slag distinctly different from the original slag would have been obtained owing to the destruction of the silica, so that taken altogether the operation would have been more costly than simple replacement of the slag.

On the other hand, it was found that a slag with a similar content of silica and containing 18% of MnO was easily reduced to 13% of MnO without any extensive reduction of the silica and without any considerable expenditure of reducing agents, or power if the regeneration is carried out in a furnace.

The example given shows that with 52.3% of silica in the slag, the regeneration of a slag containing 5.06% of MnO is no longer possible economically but if a slag less rich in silica was used initially, the regeneration at about 5% of MnO would still be economically possible without any excessive reduction of silica.

Because of the fact that a limited regeneration of the slag only is necessary, the regeneration of the slag to the desired minimum contents of FeO and MnO, by discarding a fraction of the slag and adding slag-making constituents is rendered easier. For instance, if we take the case of MnO and of deoxidizing a steel containing manganese, and if we assume further, as is the case in practice, that at each deoxidizing operation of the steel the slag becomes richer by 3% of MnO, and if we start, for the first deoxidizing operation, with a slag containing no MnO, and if finally, as just mentioned, no reduction of the MnO is made, it is necessary at each operation to replace the whole of the slag, in order to secure a slag of the original composition, with the incident expense in fresh raw materials and heat. If however, we start from a slag containing 18% of MnO, its content of MnO, after intermixing with the oxidized steel, will be 21%. In order to bring the content to 18%, it is sufficient to remove ⅐th of the slag and put back in the slag the same weight in other constituents of the slag: silica, alumina, magnesia and lime for instance. Naturally, no MnO is added. The cost of consumption of slag per ton of deoxidized steel falls to about ⅐th of what it would have been if, for each steel deoxidizing operation, use had been made of a slag entirely free from MnO.

As in the case of an unlimited regeneration the limited regeneration of the slag whereby its iron oxide and/or manganese oxide content is but partially reduced, may be carried out, for example, by treating the slag in a furnace with a deoxidizing agent under controlled conditions so as to effect the desired reduction in the iron and/or manganese content, or by a combination of adding new slag-making materials and the lowering of the iron oxide content by a reducing operation.

It will therefore be apparent that my process, in which the steel is deoxidized and then the exhausted slag is subjected to a limited regeneration to effect a partial reduction of its iron and/or manganese oxide contents, may be carried out by various specific procedures for effecting such limited regeneration of the slag. The process in which the slag is re-used with but a partial or limited reduction of its iron and/or manganese oxide contents is predicated upon my discovery that effective deoxidation of steel may be accomplished in accordance with my process with slags which are not entirely freed of iron and/or manganese oxides, which fact allows the process to be carried out with economical re-use of the slags by subjecting them to a limited regeneration; that is to say, a regeneration which does not completely reduce the iron and/or manganese contents but allows a certain minimum percentage of these oxides to remain in the regenerated slag.

In making up an entirely fresh slag, it is desirable to start with a slag containing a minimum of MnO and FeO. The slag is then allowed to become richer in MnO and FeO in the deoxidizing operations on the steel, without regeneration by reducing agents or by fractionating, and these operations will be carried out only at the end of the $n$/th intermixing with oxidized steel, after the limits of MnO and FeO which have been set down for normal working have been exceeded in the slag. These normal upper limits are dependent upon the following conditions:

1. Lower limit of content of residual oxygen desired in the case of steel, for said content is obviously lowered as the contents of MnO and FeO in the slag are decreased, the contents of the other elements of the slag being unaffected.

2. Content of the other constituents of the slag.

3. Cost limit desired for the regeneration of the slags.

It will thus be possible in each particular case to define the upper and lower limits for the contents of MnO and FeO in the slag.

This application is a continuation-in-part of my copending applications Serial Nos. 658,278, filed February 23, 1933; and 658,273, filed February 23, 1933. Generic claims for the process of treating metal with slag by causing the intimate admixture thereof are presented in my Patent No. 2,015,691.

What I claim is:

1. A process for regenerating an oxidized slag in a molten condition which consists in violently intermixing said slag with an agent capable of reducing oxides of the oxidized slag so as to bring said slag to a condition of thorough division and mixing with the reducing agent.

2. A process for regenerating an oxidized slag in a molten condition which consists in violently intermixing said slag with a powdered agent capable of reducing oxides of the oxidized slag, so as to bring the slag to a condition of thorough division and mixing with the reducing agent.

3. A process for generating an oxidized slag in a molten condition which consists in violently intermixing said slag with a previously molten agent capable of reducing oxides of the oxidized slag so as to bring the slag to a condition of thorough division and mixing with the reducing agent.

4. A process for regenerating an oxidized slag in a molten condition which consists in violently and intimately intermixing the slag with a powdered reducing agent.

5. A process for regenerating an oxidized slag in a molten condition which consists in violently and intimately intermixing the slag with a reducing agent, so as to form almost instantaneously a mixture in the nature of an emulsion.

6. A process for regenerating an oxidized slag in a molten condition which consists in turbulently emulsifying the slag with a previously molten reducing agent.

7. A process for the regeneration of an oxidized slag which consists in imparting kinetic energy to the said slag and utilizing said energy for violently intermixing the slag with a reducing agent capable of reducing oxides present in the slag, thereby causing the particles of slag to be brought quickly into contact with particles of said reducing agent.

8. A process for regenerating an oxidized slag which consists in violently pouring the said slag onto a reducing agent placed in the bottom of a ladle.

9. A process for regenerating an oxidized slag in a molten condition which consists in pouring the oxidized slag in a thick jet from a considerable height onto a reducing agent placed in the bottom of a container.

10. A process for regenerating an oxidized slag in a molten condition which consists in pouring the oxidized slag in a thick jet from a considerable height onto a powdered reducing agent placed in the bottom of a container.

11. A process for regenerating an oxidized slag in a molten condition which consists in pouring the oxidized slag in a thick jet from a considerable height onto a previously molten reducing agent placed in the bottom of a container.

12. A process for regenerating an oxidized slag in a molten condition which consists in placing in the bottom of a container a certain quantity of molten slag of the same nature as the slag to be regenerated and a reducing agent capable of reducing oxides contained in the slag, and violently pouring onto the reducing agent and the slag in the container the molten slag to be regenerated.

13. A process for the regeneration of an oxidized slag in a molten state which consists in adding to the slag a reducing agent capable of reducing oxides present therein, and then intermixing the molten slag and the reducing agent with such violence as to effect the almost instantaneous diffusion of the reducing agent throughout the mass of slag.

14. A process for reducing the oxides contained in an oxidized slag in a molten conditon which consists in placing in the bottom of a container a certain quantity of molten slag of the same nature as the slag to be deoxidized and a reducing agent capable of reducing oxides contained in the slag, and pouring onto the reducing agent and the slag in the container the molten slag to be deoxidized with such violence as to form speedily an intimate and turbulent admixture of the slag with the reducing agent.

15. A process for reducing the oxides contained in an oxidized slag in a molten state which consists in adding to the slag a reducing agent capable of reducing oxides present in the oxidized slag and then pouring the slag and added reducing agent into a container with such violence as to cause a thorough comminuting of the reducing agent and an intimate mixing of the comminuted reducing agent and of the slag to take place.

16. The process of deoxidizing metal, which comprises forming a molten bath of the metal to be deoxidized, forming a bath of a fluid molten deoxidizing slag, intermixing the slag and metal with such violence and intimacy as to bring about immediately a substantially complete deoxidation of the metal, thereafter regenerating the slag by violently and intimately intermixing therewith a reducing agent, and thereafter re-using the regenerated slag for the deoxidation of a further quantity of molten metal.

17. A process for the deoxidization of molten oxidized steel which consists in violently intermixing the said steel with a molten very fluid slag capable of extracting dissolved metallic oxides from the steel, regenerating the slag by violently intermixing it with such a reducing agent and to such an extent that the FeO content is not lower than 1.5% and that the MnO content is not lower than 3%, and using the said so partially deoxidized slag for a renewed steel deoxidizing operation by violently intermixing the same with a fresh heat of oxidized steel.

18. The process of deoxidizing ferrous metals which comprises the steps of: forming a turbulent mass of the metal in a molten state and a fluid deoxidizing slag thereby effecting the deoxidation of the metal; separating the slag from the metal; regenerating the slag by treating it with a reducing agent for reducing the oxides absorbed from the metal; removing part of its exhausted contents and replacing the same by fresh slag-making materials thereby lowering the content in oxides absorbed from the metal to such extent as to renew the oxide-extracting capacity of the slag; and reusing the thus regenerated slag in a repetition of the operation for deoxidizing a mass of molten metal.

19. The process of removing oxygen from a metal, which comprises violently intermixing said metal with a fluid slag capable of absorbing oxides out of the said metal, separating the oxidized slag from the metal, lowering its oxide content by violently intermixing therewith a deoxidizing agent reducing mainly iron oxide and further by adding new slag-making materials, in place of exhausted constituents of the slag and re-using the so regenerated slag for performing a new metal deoxidizing operation.

20. The process of regenerating an exhausted deoxidizing slag containing iron oxide, which comprises violently intermixing the slag with a reducing agent, discarding a fraction of the exhausted slag and supplying fresh slag-making constitutents so as to thereby form a slag having an iron oxide content not lower than 1.5%, while containing not so much manganese oxide as would prevent the slag from being highly capable of extracting oxides out of oxidized ferrous metal.

21. The process of regenerating an exhausted deoxidizing slag containing manganese oxide together with iron oxide, which comprises discarding a fraction of the slag and supplying fresh slag-making constituents so as to thereby form a slag having a manganese oxide content not lower than 3% while lowering its iron oxide content mainly by reduction with a deoxidizing agent to such an extent that the slag is rendered highly capable of extracting iron oxides out of oxidized ferrous metals.

22. A process for the deoxidization of molten oxidized steel which consists in violently intermixing the said steel with a molten very fluid slag capable of extracting dissolved metallic oxides out of the said steel, regenerating the slag by such a violent intermixing thereof with a reducing agent and further by such an addition thereto of components other than the said metallic oxides and in such quantity as to lower the content of FeO to such extent that an oxide-extracting slag is formed having an FeO content not substantially below 1.5%, and a content of MnO not substantially below 3%, and using the so partially regenerated slag for a renewed steel deoxidization operation by violently intermixing the said so partially regenerated slag with a fresh heat of oxidized steel.

23. A process for the deoxidation of molten oxidized steel which consists in violently intermixing the same with a molten very fluid slag capable of extracting dissolved metallic oxides from said steel, regenerating said slag by violently intermixing therewith a reducing agent to lower its FeO content to approximately 1.5% and further by adding fresh slag-making materials sufficient to lower its MnO content to approximately 3% and reusing the so partially regenerated slag for a new steel deoxidation operation.

24. A process for the deoxidization of molten oxidized steel which consists in violently intermixing the said steel with a molten very fluid slag containing no substantial quantity of those metallic oxides which are dissolved in the steel and of such a character that it will extract dissolved metallic oxides out of the said steel, separating the slag enriched in oxides from the steel, using the slag so partially enriched in oxides for performing successive steel deoxidization operations by violently intermixing the same with fresh heats of oxidized steel, thereafter effecting such a regeneration of the said oxidized slag by violently intermixing the same with a reducing agent that the content of FeO is higher than 1.5% and by adding fresh slag constituents such that the content of MnO is higher than 3% and using the so partially regenerated slag for a further steel deoxidization operation by violently intermixing it with a fresh heat of oxidized steel.

25. In a cyclic process of removing oxygen from steel with an oxide-extracting slag and regenerating the exhausted slag, in which process, after the steel has been deoxidized by being violently intermixed with a molten fluid slag which absorbs the oxides out of the steel, the slag charged with said oxides and also enriched in lime which has been brought with the steel from the basic furnace, is separated from the deoxidized steel and is then subjected to regeneration, the steps of lowering mainly the iron oxide content of said slag by a reducing treatment of the said slag in a furnace, bringing back to substantially their initial values the contents of the slag in manganese oxide and in lime by adding new slag-making materials in place of the exhausted constituents of the slag, and re-using the so regenerated slag in a new steel deoxidizing operation.

26. The process of removing oxygen from a metal, which comprises violently intermixing said metal with a fluid oxide-extracting slag, separating from the metal the slag which is enriched with the oxides absorbed out of the metal and also with lime originating from basic slag brought with the steel from the basic furnace, then lowering the oxide content of the slag by violently intermixing the same with a deoxidizing agent reducing mainly iron oxide and further by adding new slag-making materials in place of exhausted constituents of the slag such as to bring back the contents of the slag in manganese oxide and in lime to the desired low values, and thereafter re-using the so regenerated slag for performing a new metal deoxidizing operation.

27. A process for deoxidizing oxidized steel by means of an oxide-extracting slag and thereafter regenerating the exhausted slag, which regeneration process consists in effecting the said regeneration of the slag by the combined operations of removing a part of the exhausted slag and substituting for the same fresh slag-making materials, thereby reducing the content mainly of the manganese oxide; and subjecting the remaining exhausted slag to a reduction in a furnace thereby reducing mainly the iron oxide.

RENÉ PERRIN.